(12) United States Patent
Drevet et al.

(10) Patent No.: US 12,703,171 B1
(45) Date of Patent: Aug. 11, 2026

(54) DIRECT LAMINATION OF A MELAMINE LAYER TO A MAGNESIUM OXIDE CORE

(71) Applicant: Columbia Insurance Company, Omaha, NE (US)

(72) Inventors: Anthony Drevet, Chattanooga, TN (US); Christopher Karl Andrews, Chattanooga, TN (US)

(73) Assignee: Columbia Insurance Company, Omaha, NE (US)

( * ) Notice: Subject to any disclaimer, the term of this patent is extended or adjusted under 35 U.S.C. 154(b) by 84 days.

(21) Appl. No.: 17/449,669

(22) Filed: Oct. 1, 2021

Related U.S. Application Data

(63) Continuation-in-part of application No. 16/580,668, filed on Sep. 24, 2019, now Pat. No. 12,109,790.

(60) Provisional application No. 63/198,198, filed on Oct. 2, 2020, provisional application No. 62/735,607, filed on Sep. 24, 2018.

(51) Int. Cl.
*B32B 7/12* (2006.01)
*B32B 29/06* (2006.01)
*B32B 37/12* (2006.01)

(52) U.S. Cl.
CPC ................ *B32B 7/12* (2013.01); *B32B 29/06* (2013.01); *B32B 37/1284* (2013.01); *B32B 2037/1215* (2013.01); *B32B 2250/03* (2013.01); *B32B 2250/40* (2013.01); *B32B 2260/028* (2013.01); *B32B 2260/046* (2013.01); *B32B 2311/00* (2013.01); *B32B 2471/00* (2013.01)

(58) Field of Classification Search
CPC ....... B32B 7/12; B32B 29/06; B32B 37/1284; B32B 2037/1215; B32B 2250/03; B32B 2250/40; B32B 2260/028; B32B 2260/046; B32B 2311/00; B32B 2471/00
See application file for complete search history.

(56) References Cited

U.S. PATENT DOCUMENTS

| | | | |
|---|---|---|---|
| 2,182,291 | A | 12/1939 | Fleuret |
| 3,908,725 | A | 9/1975 | Koch |
| 4,724,187 | A | 2/1988 | Ungar et al. |
| 6,248,812 | B1 | 6/2001 | Symons |
| 6,440,538 | B1 | 8/2002 | Ungar |
| 6,617,009 | B1 | 9/2003 | Chen et al. |
| 6,986,934 | B2 | 1/2006 | Chen et al. |
| 7,155,871 | B1 | 1/2007 | Stone et al. |

(Continued)

FOREIGN PATENT DOCUMENTS

| | | |
|---|---|---|
| BE | 1019331 | 6/2012 |
| CA | 2795411 | 10/2012 |

(Continued)

OTHER PUBLICATIONS

U.S. Pat. No. 795,399—Jul. 25, 1905—Layburn.

(Continued)

*Primary Examiner* — Sathavaram I Reddy
(74) *Attorney, Agent, or Firm* — Miller & Martin PLLC

(57) ABSTRACT

Embodiments of the present disclosure include a floor panel having a melamine-impregnated layer laminated on a layered magnesium-oxide core. The layered magnesium-oxide core can comprise one or more adhesion-promoting layers including an adhesion-promoting agent, such as cellulosic fibers, polymers, or adhesive.

12 Claims, 2 Drawing Sheets

(56) References Cited

U.S. PATENT DOCUMENTS 7,169,460 B1 1/2007 Chen et al.
7,211,310 B2 5/2007 Chen et al.
7,220,297 B2 5/2007 Pipko et al.
7,261,947 B2 8/2007 Reichwein et al.
7,419,717 B2 9/2008 Chen et al.
7,527,856 B2 5/2009 Thiers et al.
7,544,423 B2 6/2009 Horton
7,678,425 B2 3/2010 Oldorff
7,763,345 B2 7/2010 Chen et al.
7,770,350 B2 8/2010 Moriau et al.
7,866,115 B2 1/2011 Pervan et al.
7,877,956 B2 2/2011 Martensson
7,998,547 B2 8/2011 Feigin et al.
8,021,741 B2 9/2011 Chen et al.
8,099,919 B2 1/2012 Garcia
8,171,691 B1 5/2012 Stone
8,234,829 B2 8/2012 Thiers et al.
8,431,054 B2 4/2013 Pervan et al.
8,631,624 B2 1/2014 McIntosh et al.
8,834,992 B2 9/2014 Chen et al.
8,875,465 B2 11/2014 Mårtensson
9,745,758 B2 8/2017 Baert et al.
9,783,996 B2 10/2017 Pervan et al.
9,994,010 B2 6/2018 Pervan
2001/0007710 A1 7/2001 Liu et al.
2002/0025446 A1 2/2002 Chen et al.
2002/0046527 A1 4/2002 Nelson
2003/0024199 A1 2/2003 Pervan et al.
2004/0016196 A1 1/2004 Pervan
2004/0200154 A1 10/2004 Hunter, Jr.
2004/0248489 A1 12/2004 Hutchison et al.
2004/0255538 A1 12/2004 Ruhdorfer
2005/0003160 A1 1/2005 Chen et al.
2005/0136234 A1 6/2005 Hak et al.
2005/0281997 A1 12/2005 Grah
2006/0032175 A1 2/2006 Chen et al.
2006/0070321 A1* 4/2006 Au .......................... C04B 28/26 52/741.1
2007/0130872 A1 6/2007 Goodwin et al.
2008/0261019 A1 10/2008 Shen et al.
2009/0011670 A1 1/2009 Wisenbaker, Jr. et al.
2010/0247937 A1* 9/2010 Liu ......................... C04B 28/14 427/331
2011/0167744 A1 7/2011 Whispell et al.
2011/0247285 A1 10/2011 Wybo et al.
2011/0300392 A1 12/2011 Vermeulen
2013/0171377 A1 7/2013 Aravamudan
2013/0192158 A1 8/2013 Cappelle et al.
2014/0290158 A1 10/2014 Meersseman et al.
2014/0356594 A1 12/2014 Chen et al.
2015/0159379 A1 6/2015 Meersseman et al.
2015/0167320 A1 6/2015 Meersseman et al.
2015/0290968 A1 10/2015 Hannig
2016/0083965 A1* 3/2016 Baert .................. B29C 65/4805 52/309.1
2016/0369507 A1 12/2016 Pervan et al.
2017/0298639 A1 10/2017 Song
2018/0171631 A1 6/2018 Klug et al.
2018/0258650 A1 9/2018 Meersseman et al.
2018/0291638 A1 10/2018 Pervan
2019/0010711 A1 1/2019 Pervan et al.

FOREIGN PATENT DOCUMENTS

CA 2852656 A1 * 4/2013 ............. B32B 21/08
CN 1043279 12/1989
CN 1052819 7/1991
CN 2193935 4/1995
CN 1113850 12/1995
CN 1118771 3/1996
CN 11189566 8/1998
CN 1194202 9/1998
CN 1245855 3/2000
CN 2642917 9/2003
CN 1446993 10/2003
CN 1482166 3/2004
CN 1792986 6/2004
CN 1656291 8/2005
CN 2765969 3/2006
CN 1850712 10/2006
CN 1911997 2/2007
CN 2880871 3/2007
CN 101003990 7/2007
CN 101042014 9/2007
CN 101115616 1/2008
CN 200720034739.X 1/2008
CN ZL 200620075187.2 2/2008
CN 101173554 5/2008
CN 201071580 6/2008
CN 201128262 10/2008
CN 101323188 12/2008
CN 101367977 2/2009
CN 101386516 3/2009
CN 201209309 3/2009
CN 101423349 5/2009
CN 101446128 6/2009
CN 101487336 7/2009
CN 101545309 9/2009
CN 101564922 10/2009
CN 201339298 11/2009
CN 101614068 12/2009
CN 101767362 7/2010
CN 201539080 8/2010
CN 201679203 12/2010
CN 202023326 12/2010
CN 101955614 1/2011
CN 101613503 5/2011
CN 101698749 10/2011
CN 102245690 11/2011
CN 102287038 12/2011
CN 202265980 6/2012
CN 201120467334 7/2012
CN 201120467683 7/2012
CN 202483139 10/2012
CN 102803177 11/2012
CN 102933385 2/2013
CN 107165376 9/2017
CN 207144220 3/2018
DE 202017100592 5/2017
EP 2060389 5/2009
EP 2202056 6/2010
EP 2263867 3/2012
EP 2569151 2/2013
EP 2248665 9/2016
ES 2268547 3/2007
FI 114462 10/2004
GB 518239 2/1940
JP 671731 10/1994
JP 7223856 8/1995
JP 2000054528 2/2000
JP 2000297496 10/2000
JP 2000303394 10/2000
JP 2001140401 5/2001
JP 2002274928 9/2002
JP 2009132078 11/2007
JP 5839097 1/2016
KR 100710919 4/2007
KR 20110045402 5/2011
KR 20130077823 7/2013
NO 2010081860 7/2010
RU 2081135 6/1997
RU 2329362 7/2008
RU 2379249 1/2010
WO 2001083888 11/2001
WO 2001085642 11/2001
WO 2001094716 12/2001
WO 2006084513 8/2006
WO 2012061300 5/2012
WO 2017072657 5/2017
WO 2018034614 2/2018

(56) References Cited

FOREIGN PATENT DOCUMENTS

| | | |
|---|---|---|
| WO | 2018068197 | 4/2018 |
| WO | 2018234561 | 12/2018 |

OTHER PUBLICATIONS

AQUA-STEP; Promotional Website, Internet, Allegedly Nov. 24, 2009.

Lauefenberg, Theodore L et al., Phosphate-Bonded Ceramic-Wood Composites: R&D Project Overview and Invitation to Participate (Oct. 2004).

* cited by examiner

DIRECT LAMINATION OF A MELAMINE LAYER TO A MAGNESIUM OXIDE CORE

CROSS-REFERENCE TO RELATED APPLICATIONS

This application titled "Direct Lamination of a Melamine Layer to a Magnesium Oxide Core" is a continuation-in-part application claiming the benefit to U.S. patent application Ser. No. 16/580,668 filed Sep. 24, 2019 titled "Composite Panels Having a Melamine Impregnated Protective Layer," which claims the benefit of Provisional Application No. 62/735,607 filed Sep. 24, 2018 and titled "Solid Polymer-Based or Mineral-Based Core Flooring and Wall Panel Having Melamine Impregnated Paper Wear layer," which is hereby incorporated by reference in its entirety as if set forth below. This application also claims priority to Provisional Application No. 63/198,198 filed Oct. 2, 2020 titled "Direct Lamination of a Melamine Layer to a Magnesium Oxide Core."

BACKGROUND

There is a growing desire in the flooring industry to create laminate flooring products with a magnesium-oxide core that are scratch-resistant, water-resistant, and may be affixed to each other in a manner that avoids movement underfoot. The adhesive and wear-resistant properties of melamine, melamine formaldehyde, or melamine urea formaldehyde treated papers are an attractive option for flooring manufactured using lamination processes.

Magnesium-oxide cores cannot hold a melamine-impregnated layer directly laminated thereon. When subject to conventional lamination processes that involve applying heat and pressure, the magnesium-oxide cores release moisture, which interferes with the adhesion properties of the melamine-impregnated layer. This causes delamination of the melamine layer during use, which is highly undesirable.

Embodiments of the present disclosure are directed to these and other considerations.

SUMMARY OF THE INVENTION

Embodiments of the present disclosure are directed to improved floor panels and methods for providing such improved floor panels. Specifically, the improved floor panels include one or more melamine-impregnated layers that have been directly laminated onto a magnesium-oxide core, the magnesium-oxide core having been manufactured using a wet-process method. Such direct lamination can be achieved by providing a layered magnesium-oxide core in which layers or portions of the layered magnesium-oxide core (specifically those that directly contact the melamine-impregnated layer) include an adhesion-promoting agent. The adhesion-promoting agent can be cellulosic fibers (e.g., wood, bamboo, rice straw fibers), a polymer (e.g., PET, polyurethane, and polyester), or an adhesive.

Due to the inclusion of adhesion-promoting layers in the core, the floor panels exhibit markedly improved adhesion properties between the melamine-impregnated layer and magnesium-oxide core, thus preventing delamination during use. Specifically, the adhesion-promoting layers act as a buffer to prevent moisture from being released from the core and allow for quick adhesion of the melamine-impregnated layer to the core upon application of heat and pressure.

Such floor panels can further include any known locking mechanism to allow for interconnection with other floor panels to create a floating floor.

DETAILED DESCRIPTION

Figure 1:
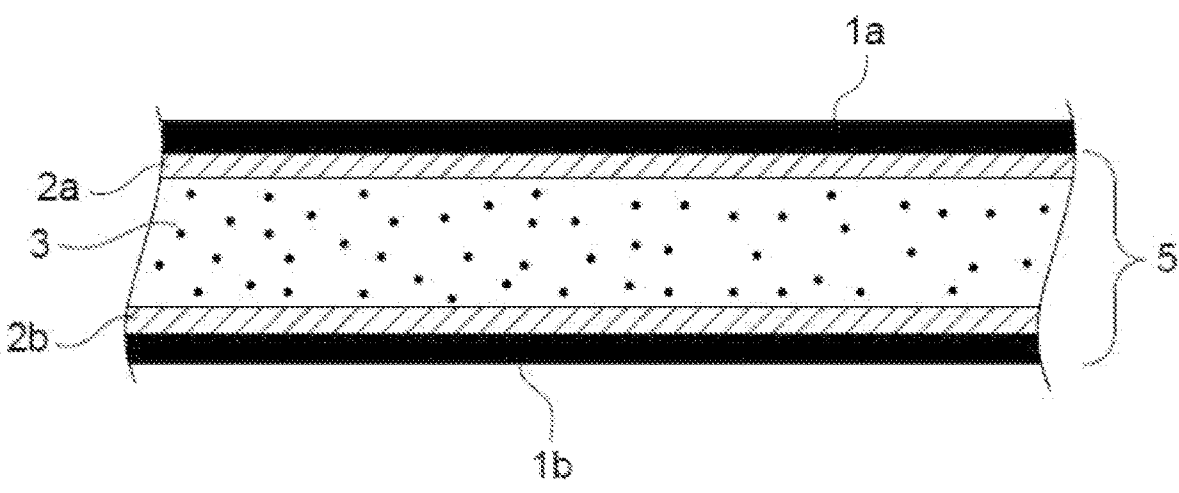
FIG. 1 is a vertical cross-section of a floor panel, according to one embodiment of the present disclosure.

FIG. 1 is a vertical cross-section of a floor panel, according to one embodiment of the present disclosure. The floor panel comprises a top melamine-impregnated layer 1*a* and may further comprise an optional bottom melamine-impregnated layer 1*b* bonded to the top and bottom surfaces of a layered core 5. The layered core 5 comprises at least a top adhesion-promoting layer 2*a* and a magnesium-oxide layer 3. If a bottom melamine-impregnated layer 1*b* is desired, a bottom adhesion-promoting layer 2*b* is also provided on the core 5. A layered core 5 having both top and bottom melamine-impregnated layers 1*a*, 1*b* is preferred, but not required.

The top and bottom melamine-impregnated layers 1*a*, 1*b* can be applied to the layered core 5 using a lamination process (e.g., hot-press lamination) such that the top melamine-impregnated layer 1*a* can be adhered to the top adhesion-promoting layer 2*a* and the bottom melamine-impregnated layer 1*b* can be adhered to the bottom adhesion-promoting layer 2*b*.

The melamine-impregnated layers 1*a*, 1*b* can be substantially scratch-resistant to accommodate the wear-and-tear of normal use. The melamine-impregnated layers 1*a*, 1*b* can be any one of melamine formaldehyde (MF) or melamine urea formaldehyde (MUF) treated papers, films, or other decorative layers. In some embodiments, the melamine-impregnated layers 1*a*, 1*b* can comprise a decorative pattern applied to the paper, film, or other decorative layer. For instance, the decorative pattern can be applied using a digital-printing process. In one or more example embodiments, the melamine-impregnated layer 1*a* (top melamine layer) can be a melamine-impregnated paper décor layer which acts as a decorative layer, a wear layer, and/or a scratch resistant layer; and the melamine-impregnated layer 1*b* (bottom balancing layer) can be a melamine-impregnated paper layer (may not include the decorative image).

In some embodiments, the melamine-impregnated layers 1*a*, 1*b* can comprise texturing or embossing to provide a natural appearance to the floor panel. For instance, texturing or embossing can be applied using a continuous press, a batch press, or similar lamination process.

In some embodiments, the melamine-impregnated layers 1*a*, 1*b* can also include an additive to promote bonding with the layered core 5.

The adhesion-promoting layers 2*a*, 2*b* of the layered core 5 can comprise magnesium oxide and an adhesion-promoting agent. In some embodiments, the adhesion-promoting agent can comprise at least one of cellulosic fibers (e.g., wood, bamboo, rice straw fibers), polymers (e.g., PET, polyurethane, and polyester), or an adhesive to promote adhesion between the layered core 5 and the melamine-impregnated layers 1*a*, 1*b* when laminated together. In some embodiments, the adhesion-promoting layers 2*a*, 2*b* can have substantially the same composition as the magnesium-oxide layer 3 apart from the addition of the adhesion-promoting agent.

In some example embodiments, the density of the layered core 5 may be uniform across the different layers (2*a*, 3, 2*b*). However, in other example embodiments, the layered core 5 may have different densities across the various layers. For example, the densities of one or both of the adhesion-promoting layers 2*a*, 2*b* may be different (higher or lower) from the magnesium-oxide layer 3. Further, in some example embodiments, the top adhesion-promoting layer 2*a* may have a print-adhesion promoting agent that configures the surface of the layered core 5 for receiving direct digital printing thereon and promotes adhesion of the digitally printed ink to the layered core 5 (e.g., exhibiting a pull value of at least 7). In said example embodiments, where an image is directly digitally printed on the layered core 5, the melamine-impregnated layer may be transparent and may be configured to enhance the clarity of the image on the layered core 5 (or otherwise prevent a blurred look).

In some embodiments, the adhesion-promoting layers 2*a*, 2*b* can have from approximately 15% by weight to approximately 50% by weight of adhesion-promoting agent.

In some embodiments, the adhesion-promoting layers 2*a*, 2*b* can further comprise a filler to fill any pits or voids in the adhesion-promoting layers 2*a*, 2*b*. The filler can be any conventional filler material, such as wood putty or polymers.

While the embodiment of the layered core 5 of the floor panel illustrated in FIG. 1, includes a top and a bottom adhesion-promoting layer 2*a*, 2*b*, it is understood that in some embodiments, the floor panel may have only one adhesion-promoting layer. For instance, in an embodiment where the floor panel only has a top melamine-impregnated layer 1*a*, the layered core 5 may only include a top adhesion-promoting layer 2*a*.

The layered core 5 can also comprise a magnesium-oxide layer 3 disposed below the top adhesion-promoting layer 2*a*. In some embodiments, the magnesium-oxide layer 3 can comprise magnesium oxide and magnesium chloride. In some embodiments, the magnesium-oxide layer 3 can additionally comprise a sulfate. The magnesium-oxide layer 3 can be substantially free of the adhesion-promoting agent. In some example embodiments, the magnesium oxide layer 3 and/or the adhesion-promoting layers (2*a*, 2*b*) may include at least 30% ash content.

In some embodiments, the layered core 5 can be formed using a wet process. During the wet process, the two or more adhesion-promoting layers 2*a*, 2*b* can be applied to the magnesium-oxide layer 3 to form the layered core 5. Wet process formation of a magnesium-oxide core includes mixing the components of the core as a slurry and then curing the slurry over time. When forming the layered core using a wet process, the various layers would be applied sequentially. In some example embodiments, the layered core 5 can be formed using a dry process (e.g., a non-slurry process where ingredients are mixed in dry form and compressed to form the core) without departing from a broader scope of the present disclosure.

Figure 2:
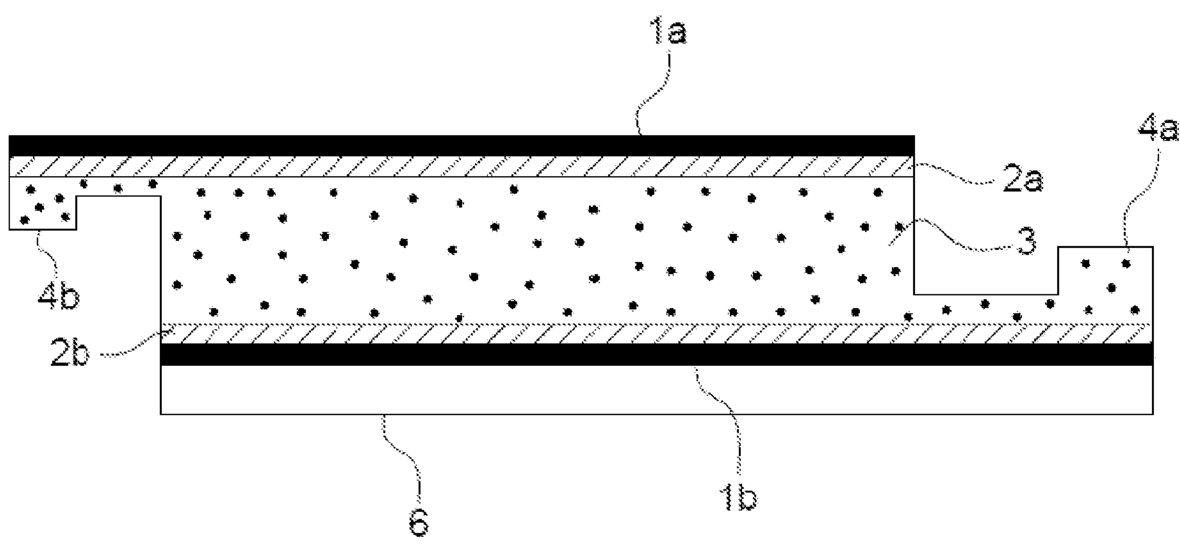
FIG. 2 is a vertical cross-section of a floor panel additionally including a locking mechanism and backing layer, according to one embodiment of the present disclosure.

FIG. 2 is a vertical cross-section of a floor panel, according to one embodiment of the present disclosure. The floor panel of FIG. 2 is similar to that illustrated in FIG. 1 except that it includes a locking mechanism profile 4*a*, 4*b* and an optional backing layer 6.

The locking mechanism profile 4*a*, 4*b* can allow for several floor panels to be linked together to provide a floating floor. The layered core 5 can have an internal bond strength to accommodate milling or cutting a locking mechanism profile 4*a*, 4*b* within the layered core 5. To allow for milling or cutting the locking mechanism profile 4*a*, 4*b*, the internal bond strength of the layered core 5 can be at least 1.5 $N/mm^2$. In some embodiment, the internal bond strength can be achieved by including a fiberglass mesh within the layered core 5. The locking mechanism profile 4*a*, 4*b* can be any locking mechanism known in the art.

In some embodiments, the floor panel can comprise an optional backing layer 6. The backing layer 6 can be applied to improve the soundproofing or comfort of the floor underfoot.

The floor panel can be cut in various dimensions and created in various thicknesses depending on product design needs. In an exemplary embodiment, the total thickness of the floor panel can be from approximately 4 mm to approximately 6 mm. In some embodiments, the total thickness of the floor panel can be approximately 3 mm. In some embodiments, the thickness of the floor panel can be from approximately 3 mm to approximately 22 mm.

Embodiments of the present disclosure can also comprise a method for manufacturing a floor panel. The method can comprise forming a layered core using a wet process, comprising creating a first layer comprising magnesium oxide and an adhesion-promoting additive, applying a second layer on top of the first layer, the second layer being substantially free of the adhesion-promoting additive, and applying a third layer on top of the second layer, the third layer comprising magnesium oxide and an adhesion-promoting additive. The method of making can further comprise laminating a melamine-impregnated layer to a top surface of the layered core using a hot-press process.

In some embodiments, the laminating step can also comprise laminating a melamine-impregnated layer to a bottom surface of the layered core using a hot-press process.

In some embodiments, prior to the laminating step, the layered core can be sanded.

In some embodiments, the method of making can further comprise cutting a locking mechanism profile on both ends of the floor panel.

In some embodiments, the method of making can further comprise attaching a backing layer to the floor panel.

We claim:

1. A floor panel comprising:

a layered core comprising:

a first layer comprising magnesium oxide and cellulosic fibers;

a second layer disposed directly below the first layer, the second layer comprising magnesium oxide and being substantially free of cellulosic fibers, wherein a density of the second layer is greater than or equal to a density of the first layer, and a first melamine-impregnated layer disposed above the first layer and directly bonded to a top surface of the first layer of the layered core;

wherein the first layer comprises from 25% by weight to 50% by weight of the cellulosic fibers.

2. The floor panel of claim 1, wherein the cellulosic fibers comprise at least one of wood, bamboo, or rice straw fibers.

3. The floor panel of claim 1, wherein the floor panel comprises a locking mechanism for interconnecting the floor panel with a subsequent floor panel.

4. The floor panel of claim 3, wherein the layered core comprises an internal bond strength of at least 1.5 $N/mm^2$.

5. The floor panel of claim 1, further comprising a third layer disposed below the second layer, the third layer comprising magnesium oxide and a second adhesion-promoting additive.

6. The floor panel of claim 5, comprising a second melamine-impregnated layer disposed below the third layer and directly bonded to a bottom surface of the third layer of the layered core.

7. A method for making a floor panel comprising:

forming a layered core comprising:

creating a second layer comprising magnesium oxide, the second layer being substantially free from cellulosic fibers;

applying a first layer directly on top of the second layer, the first layer comprising magnesium oxide and cellulosic fibers;

wherein a density of the second layer is greater than or equal to a density of the first layer;

and laminating a melamine-impregnated layer directly to a top surface of the layered core using a hot-press process.

8. A floor panel comprising:

a layered core comprising:

a first layer comprising magnesium oxide and an adhesion-promoting additive comprising cellulosic fibers;

a second layer disposed directly below the first layer, the second layer comprising magnesium oxide and being substantially free of the adhesion-promoting additive comprising cellulosic fibers, wherein a density of the second layer is greater than or equal to a density of the first layer; and a first melamine-impregnated layer disposed above the first layer and directly bonded to a top surface of the first layer of the layered core.

9. The floor panel of claim 8, wherein the cellulosic fibers comprise at least one of wood, bamboo, or rice straw fibers.

10. The floor panel of claim 9, wherein the cellulosic fibers comprise wood.

11. The floor panel of claim 1, wherein the first melamine-impregnated layer has been bonded to the top surface of the first layer of the layered core using a hot-press process.

12. The floor panel of claim 6, wherein the second melamine-impregnated layer has been bonded to the bottom surface of the third layer of the layered core using a hot-press process.

* * * * *